United States Patent [19]
Protta et al.

[11] 3,878,714
[45] Apr. 22, 1975

[54] APPARATUS FOR DETERMINING THE VELOCITY AND THE DIRECTION OF RELATIVE MOTION THEREOF WITH RESPECT TO A FLUID AND WITH REGARD TO A DIRECTION OF REFERENCE, AND THE USE OF SAID APPARATUS

[75] Inventors: Jean-Claude Protta, Onex; Antoine Savary, Chatelaine, both of Switzerland

[73] Assignee: OMF California, Inc., Los Angeles, Calif.

[22] Filed: Jan. 8, 1973

[21] Appl. No.: 321,707

[30] Foreign Application Priority Data
Jan. 17, 1972 Switzerland................... 659/72
Sept. 21, 1972 Switzerland............... 16916/72

[52] U.S. Cl.................................... 73/189; 73/186
[51] Int. Cl............................................. G01w 1/02
[58] Field of Search...................... 73/186, 189, 228

[56] References Cited
UNITED STATES PATENTS

| | | | |
|---|---|---|---|
| 3,217,536 | 11/1965 | Motsinger et al. | 73/189 |
| 3,277,706 | 10/1966 | Godet | 73/189 |
| 3,552,204 | 1/1971 | Tourmen | 73/189 |

*Primary Examiner*—Donald O. Woodiel
*Attorney, Agent, or Firm*—Silverman & Cass

[57] ABSTRACT

Apparatus for determining the velocity and direction of relative motion of an object in a fluid such as a ship in water. The apparatus includes a probe formed of a rod attached to the ship and suspended in the fluid to be subjected to a bending force caused by the fluid. The rod includes a first sensor or detector for determining the force component with respect to a direction of reference, a second sensor for determining a second force component normal to the first sensor, and means for measuring the ratio of the force components. The ratio of the force components is supplied to a device for calculating the velocity of the motion of the ship relative to the water.

9 Claims, 7 Drawing Figures

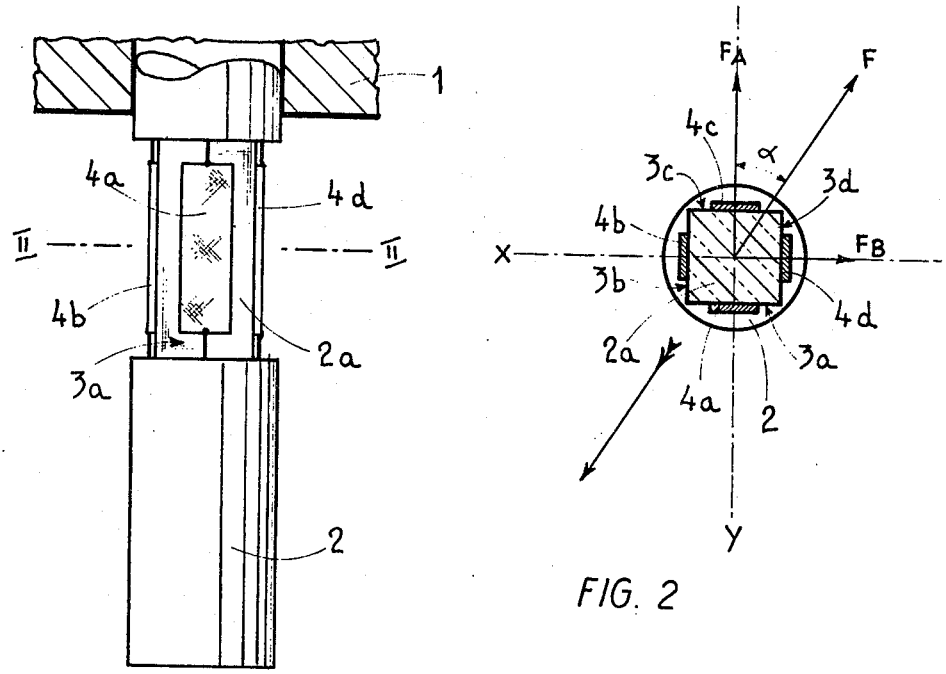
FIG. 1
FIG. 2
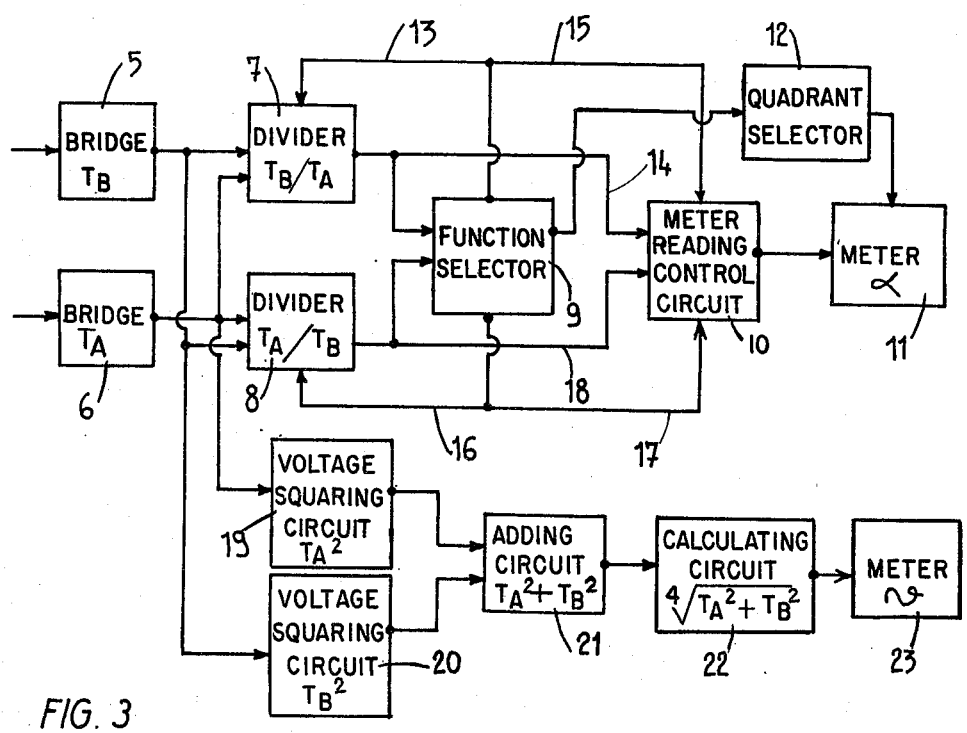
FIG. 3

APPARATUS FOR DETERMINING THE VELOCITY AND THE DIRECTION OF RELATIVE MOTION THEREOF WITH RESPECT TO A FLUID AND WITH REGARD TO A DIRECTION OF REFERENCE, AND THE USE OF SAID APPARATUS

The present invention concerns an apparatus for determining the velocity and the direction of relative motion thereof with respect to a fluid and with regard to a direction of reference. The invention also concerns the use of this apparatus for measuring the speed and drift of a ship.

It is convenient, for measuring the velocity and the angle of displacement of a fluid, gas or liquid, relatively to a fixed point or, conversely, the velocity and the direction of a body moving in a fluid, e.g. a boat on a stretch of water, to use detection apparatuses immersed in said fluid which are capable of quantitatively determining the stress produced thereon by the moving fluid streaks.

In practice one generally uses probes or fingers which permit determining either the relative velocity of the surrounding liquid or the angle of their displacement relative to a predetermined direction.

The present apparatus permits determining both of these parameters simultaneously.

The apparatus according to the invention comprises a probe constituted by a rod intented for being dipped into said fluid and which is subjected to a bending force caused by said fluid, A first sensor or detector for determining the force component in the direction of reference, a second sensor for determining a second force component at right angles to the first one, means for measuring the ratio of said force components and, hence, for determining the angle between said force and the reference direction, and a device for calculating, by means of said components, the velocity of the motion of the apparatus relative to said fluid.

The drawings represent, as Examples, four embodiments of the apparatus of the invention.

FIG. 1 represents, its protective sleeving being removed, the finger or probe of a first embodiment of an apparatus for determining the relative velocity and direction of motion of a liquid with respect to a point which is considered a fixed point, e.g. a ship.

FIG. 2 is a sectional view along line II—II of FIG. 1 whereon the force F exerted by the liquid on the probe and its components $F_A$ and $F_B$ is represented schematically.

FIG. 3 represents, in the form of a block-diagram, the various functional components of the present apparatus.

Figure 4:
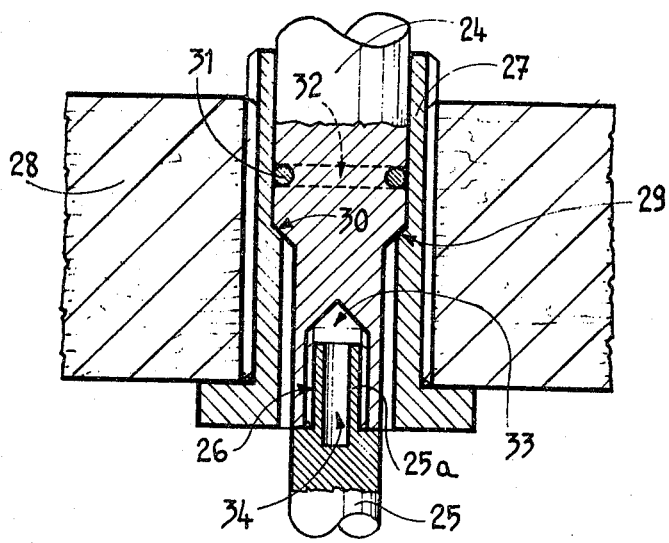
FIG. 4 is a sectional view of a detail of a second embodiment of an apparatus for determining the speed and the direction of a ship, represented schematically.

The apparatus represented on FIGS. 1 to 3 comprises a probe fastened to a supporting member 1, e.g. the bottom of a ship comprising a rod 2 made of a flexible material, e.g. a metal or a resin, part 2a of which has a square section, that is it is provided with four sides 3a, 3b, 3c and 3d, respectively.

Four strain gauges, 4a, 4b, 4c and 4d fastened each to one of the sides 3a to 3d, respectively, constitute, taken by pairs one element of which being traction-sensitive whereas the other is compression-sensitive, two sensors or detectors which operate in directions perpendicular one to the other and which give signals proportional to the degree of curvature of rod 1. Gauges 1a to 4a can be made of semi-conducting elements the resistance of which varies as a function of the tensile strength applied thereon, or they can be any other common strain-gauge.

In the present apparatus, the pairs of gauges 4a – 4c, and 4b – 4d, respectively, are connected together by conductors not shown on the drawing so as to each constitute two of the arms of Wheatstone bridges 5 and 6.

When the rod 2 of the present apparatus is under water, it moves, at right angle to its axis, at velocity v in the direction indicated by the double-finned arrow, hence it is subjected to a force F which direction makes an angle $\alpha$ with a reference axis Y perpendicular to sides 3a and 3c of the rod 2. When the rod is attached to the bottom of a ship, $\alpha$ corresponds to the drift angle of said ship. The force components along the Y axis which is the reference direction, and along the X axis which is at right angle, are shown on the drawing by $F_A$ and $F_B$, respectively. The strain detectors or sensors represented by the pairs of gauges 4a–4c and 4b–4d, respectively, furnish, by means of the bridges 5 and 6, the voltages $T_A$ and $T_B$ which are proportional to $F_A$ and $F_B$, respectively.

It should be noted that force F is proportional to the square of velocity $v$, whereas $F_A$ and $F_B$, in contrast, are not proportional to the square of the corresponding velocity components $v_A$ and $v_B$, respectively, not represented on the drawing.

Thus, according to FIG. 2 and when $F = cv^2$ (1), the following relations can be worked out:

$$\frac{F_B}{F_A} = \frac{v_B}{v_A} = \mathrm{tg}\alpha \quad (2) \text{ and}$$

$$F_A^2 + F_B^2 = c^2v^2 \quad (3) \text{ from which}$$

$$v = \sqrt[4]{F_A^2 + F_B^2} \quad (4) \text{ and}$$

$$F_A = \frac{cv^2}{\cos\alpha} \quad (5)$$

The voltages $T_A$ and $T_B$ are applied to two divider circuits 7 and 8, respectively. Circuit 7 produces a signal which corresponds to ratio $T_B/T_A$, that is to $\mathrm{tg}\alpha$, whereas circuit 8 gives a signal which corresponds to the reverse ratio, that is $\mathrm{ctg}\alpha$. These signals are applied, through a selector circuit 9 and an indicator or meter reading control circuit 10, to an indicator device 11, the latter being controlled in addition by a quadrant selector 12. The function selector 9 comprises a flip-flop circuit the state of which is determined by the relative levels of the signals produced by dividers 7 and 8. When the signal representing $\mathrm{tg}\alpha$ is at a level corresponding to $\mathrm{tg}\alpha \leq 1$ and $\mathrm{ctg}\alpha \geq 1$, selector 9 is in the proper state for sending a control signal, through line 13, for having a signal available from 7 to be sent through line 14 to circuit 10 and for having the latter, after being activated by a signal carried by line 15, to drive the indicator device 11 so that the value of the corresponding angle $\alpha$ is indicated on the meter.

At the same time, selector 9 is still being in the same state blocks the signal coming from divider 8 on line 18, by means of signals transmitted by lines 16 and 17.

When tgα becomes ≤ 1 (with ctgα ≥ 1), that is to say when angle α goes though 45° ± nπ/2, selector 9 falls into such other state that the above conditions are symmetrically inverted, which means that only signal coming from divider 8 is transmitted to the indicator device 11. This arrangement is for avoiding signals corresponding to tgα →∞(α → 90° ± π) being sent to the read device.

The read device 11 is also subjected to control from quandrant selector 12; the latter must select, upon receiving of an order from selector 9, the correct meter quandrant as a function of the number of inversion steps previously carried out by selector 9 and of the value of the voltage (negative or positive, corresponding to tgα or ctgα ); here the word "quadrant" has its common trigonometric meaning.

The meter indicator device can be a voltmeter having a degree of angle calibration or any other common metering device the response of which is a function of the magnitude of the applied electric signal. It should be noted here that although the present device is based on an analog circuit system, it could also be based on a digital system the meter read device 11 of which being a counter connected to a decade counting and indicating unit which would count the pulses generated by oscillators and frequency dividers 7 and 8, each degree of angle appearing on the indicating unit being correlated with the number of said pulses.

It should also be noted that when the present apparatus only measures the angular drift of a ship and its speed, the angle of drift practically never goes beyond 45°, in which case circuits 8, 9, and 10 and 12 could be omitted because divider 7 only measures then the value of tgα between ± 45° and hence the meter can be controlled directly.

The present apparatus also comprises two circuits 19 and 20 connected to the output of bridges 5 and 6 for squaring the voltages $T_A$ and $T_B$, respectively, and the output signals of which are added one to the other in the adding circuit 21; the quadratic root of this sum is calculated by circuit 22 in accord with equation (4) herein above, and the signal which results from this calculation and which is proportional to speed v is applied to a meter device 23, constructed about like device 11, but calibrated with other appropriate units. Preferably, the indicating device 23 is physically combined with device 11 so that v and α can be read simultaneously. It should be noted that when a ship is equipped with the present apparatus, the circuits 5, 6, 19, 20, 21, 22 and 23 of the latter, together with the probe 2, actually constitute a nautical log.

It should be noted that all electronic circuits represented on FIG. 3 by blocks 5 to 12 and 19 to 23 can be made from classical circuits known from those skilled in the art, or commercially available in the form of integrated circuits.

When the apparatus according to the invention is used for determining the speed and the direction of motion of a boat on a stretch of water, the probe is installed essentially vertically through the bottom of said boat by means of a threaded bushing screwed in said bottom and called a "hull housing." The upper part of the probe is inserted tight in the hull housing and its lower part protrudes out of the bottom so that it can be subjected to the bending stress caused by the liquid in motion.

For having this stress accurately measured by the probe, there should be no other protruding objects attached to the hull in the vicinity of the probe which could produce some deflection of the water streaks. The probe is therefore unprotected from shocks against foreign obstacles such as underwater cables, algae, stray objects, etc. . . In case of shocks, the probe can be damaged e.g. it can be bent to such extent that it can no more be removed from the hull housing.

The embodiments shown on FIG. 4 to 7 remedy those drawbacks.

In the embodiment of FIG. 4, the apparatus comprises a probe having two rods 24 and 25 screwed one to the other as at 26. This probe is inserted in a bushing 27, also called "hull housing," screwed into the bottom 28 of a boat. Rod 24 of the probe is provided with a tapered flange 29 which rests upon a seat 30 correspondingly shaped which is provided in the inside of the bushing 27. A toroidal gasket 31 which is inserted in an annular groove 32 of the rod 24 ensures proper tightness of the rod inside of bushing 27.

The tip of rod 25 has a threaded central nipple 25a screwed in a threaded hole 33 of the end of rod 24. Nipple 25a is drilled with a blind hole 34 which weakens the walls thereof so that in case rod 25 hits an obstacle, nipple 25a can break with no other damage except for a loss of rod 25.

Indeed, in such a case, rod 24 can be removed from bushing 27 for extracting the broken nipple 25a remaining in the hole 33 and for again screwing a new rod 25 into rod 24.

In this embodiment, rod 25 is thus lost definitely when nipple 25a is broken whereas, in the other embodiments described and represented herein, means are provided for not losing any part of the probe in case the latter is subjected to a shock.

Figure 5:
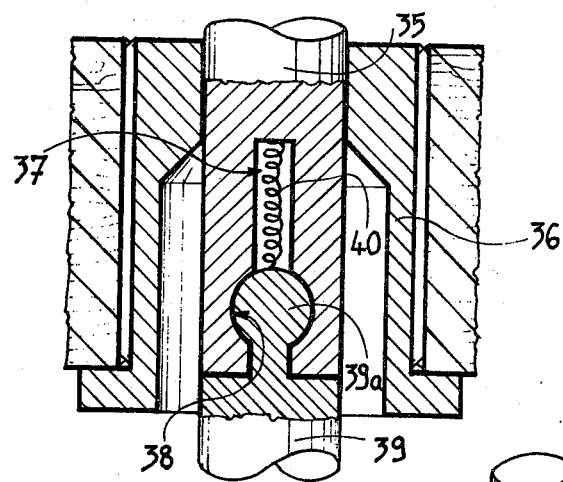
FIG. 5 is a sectional view of a detail of a third embodiment of this apparatus.

In the embodiment of FIG. 5, the probe comprises a rod 35 inserted into a bushing 36, which constitutes the hull housing, and the end of which has been provided with a slit 37. This rod 35 is also provided with an inside spherical housing 38 for accomodating the round head 39a of a rod 39 which constitutes the second part of the probe. A flexible slackened link 40 connects head 39a to the top of slit 37.

when rod 39 is hit by some object, the bending effort to which it is subjected causes the opening of the terminal part of rod 35 so that head 39a is liberated from housing 38 and rod 39 is set free. Since the latter is attached to link 40 it is not lost and it can be recovered and thereafter reset on the tip of rod 35.

Figure 6:
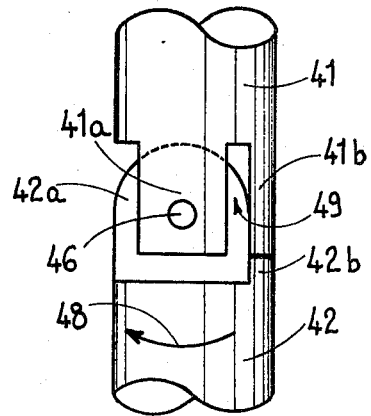
FIG. 6 is a side view of a detail of a fourth embodiment of said apparatus.
Figure 7:
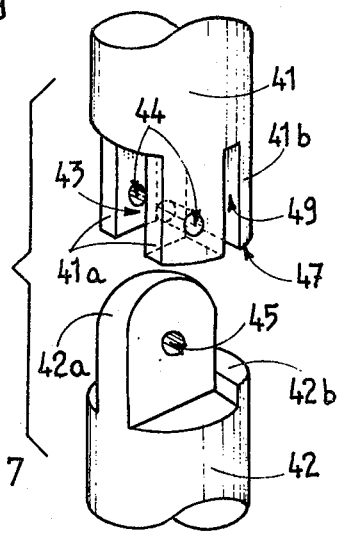
FIG. 7 is an exploded view thereof.

In the embodiment of FIG. 6 and 7, the probe comprises a rod 41 and a rod 42, one or these being articulated to the other. For this, the end of rod 41 is provided with a diametrical slit 43, the side parts 41a of which constitute two knuckles, wherein a head 42a also in the shape of a knuckle has been engaged; both parts 41a are provided with a hole 44 and part 42a is provided with a hole 45, said holes being intended for receiving an axle 46 of the articulation.

A lug 42b, which has been left out when machining the end of rod 42 for making knuckle 42a, rests in 47 against the end of rod 41 so that rod 42 can topple in the direction of the arrow 48 by turning around the axle 46 of the articulation but not the opposite way.

The end of rod 41 is further provided with a slit 49 which is at right angle to the diametrical slit 43; this is for managing a part 41b in form of a strip which elastically presses on part 42a of the rod 42 so as to maintain the latter in its operating position, that is coaxially with rod 41.

When rod 42 hits an obstacle, it topples over in the direction of the arrow 48, by rotation around axle 46, which prevents it from being damaged. As a modification, the elastic strip 41b could be arranged so as to work as a return spring for automatically pulling back rod 42 in its operating position.

What we claim is:

1. Apparatus for determining the velocity and the direction of relative motion thereof with respect to a fluid and with regard to a direction of reference, said apparatus comprising, a probe including a rod constructed to be dipped into said fluid and subjected to a bending force caused by said fluid, a first detector for determining the force component in the direction of reference, a second detector for determining a second force component at right angles to the first one, means for measuring the ratio of said force components and determining the angle between said force and the reference direction, said means including two divider circuits, one circuit constructed to measure the direct ratio of a voltage proportional to one of the force components to a voltage proportional to the other force component, and the other circuit constructed to measure the reverse ratio, and a device using said components to ascertain the velocity of the motion of the apparatus relative to said fluid.

2. The apparatus of claim 1, comprising an indicator device for receiving signals generated by said divider circuits including means for accepting of the values of said ratios, direct or reverse, only those which are larger than 1 in absolute value.

3. The apparatus of claim 2, in which said indicator device is an analog or digital voltmeter providing angle data.

4. Apparatus for determining the velocity and the direction of relative motion thereof with respect to a fluid and with regard to a direction of reference, said apparatus comprising, a probe including a rod constructed to be dipped into said fluid and subjected to a bending force caused by said fluid, a first detector for determining the force component in the direction of reference, a second detector for determining a second force component at right angles to the first one, means for measuring the ratio of said force components and determining the angle between said force and the reference direction, and a device using said components to ascertain the velocity of the motion of the apparatus relative to said fluid, said device including two signal squaring circuits, a circuit for adding the squared signals connected to said squaring circuits, a circuit connected to said adding circuit for determining the quadratic root of said sum, and an indicator device connected to said determining circuit the response of which being a function of the signal furnished by said determining circuit.

5. Apparatus for measuring the speed and the drift angle of a ship by determining the velocity and the direction of relative motion thereof with respect to a fluid and with regard to a direction of reference, said apparatus comprising, a probe including a rod constructed to be dipped into said fluid and subjected to a bending force caused by said fluid, a first detector for determining the force component in the direction of reference, a second detector for determining a second force component at right angles to the first one, means for measuring the ratio of said force components and determining the angle between said force and the reference direction, a device using said components to ascertain the velocity of the motion of the apparatus relative to said fluid, one divider circuit for measuring the ratio of the voltages generated by said first and second detectors, and an indicator device, wherein the signal producted by said divider circuit directly controls the indicator device for reading the angle of drift between the direction of motion of the ship and the direction of reference, said angle being between ±45°.

6. Apparatus for measuring the speed and the direction of a ship by determining the velocity and the direction of relative motion thereof with respect to a fluid and with regard to a direction of reference, said apparatus comprising a probe including a flexible rod constructed to be dipped into said fluid and subjected to a bending force caused by said fluid, the lower part of said rod protruding from the bottom of the ship and being connected to the remainder of the probe by means of a device which includes a zone of lesser strength, so that said protruding part is capable of dropping or bending in case of a shock thereon, and the upper part of the rod which carries the elements for detecting the bending stress is not damaged, a first detector for determining the force component in the direction of reference, a second detector for determining a second force component at right angles to the first one, means for measuring the ratio of said force components and determining the angle between said force and the reference direction, and a device using said components to ascertain the velocity of the motion of the apparatus relative to said fluid.

7. The apparatus of claim 6, in which the zone of lesser strength comprises a threaded hollow portion at the top of the lower part of the rod which is axially screwed into a threaded hole of the upper part of the rod, and the walls of which are capable of breaking in case of shock.

8. The apparatus of claim 6, in which the lower part of the rod comprises, at the top, a round nipple which is inserted and elastically maintained in a corresponding opening provided in the base of the lower part of said rod.

9. The apparatus of claim 6, in which the lower part of the rod comprises a spring, both parts of the rod being articulated one to the other, the lower part constructed to be pulled back, after a shock, by means of the spring.

* * * * *